United States Patent [19]
Noto et al.

[11] 3,997,806
[45] Dec. 14, 1976

[54] ROTOR OF FLAT-TYPE MOTOR

[75] Inventors: Kunihiro Noto, Katsuta; Hiroaki Mizoguchi, Hitachi, all of Japan

[73] Assignee: Hitachi, Ltd., Japan

[22] Filed: Dec. 6, 1974

[21] Appl. No.: 530,281

Related U.S. Application Data

[63] Continuation-in-part of Ser. No. 342,412, March 18, 1973, Pat. No. 3,863,336.

[30] Foreign Application Priority Data
Mar. 22, 1972 Japan .............................. 47-28147

[52] U.S. Cl. ................................ 310/268; 310/43; 310/61; 310/237
[51] Int. Cl.² .......................................... H02K 1/22
[58] Field of Search ........... 310/268, 227, 43, 237, 310/52, 40 MM, 61, 65, 58, 59, 66

[56] References Cited
UNITED STATES PATENTS

| | | | |
|---|---|---|---|
| 977,220 | 11/1910 | Powell | 310/65 |
| 3,263,106 | 7/1966 | Divers | 310/61 |
| 3,277,323 | 10/1966 | Parker | 310/61 |
| 3,392,293 | 7/1968 | De Boo | 310/268 |
| 3,435,267 | 3/1969 | Beyersdorf | 310/268 |
| 3,462,625 | 8/1969 | Endress | 310/61 |
| 3,466,483 | 9/1969 | Johnson | 310/268 |
| 3,471,727 | 10/1969 | Sedlock | 310/61 |
| 3,513,342 | 5/1970 | Sabev | 310/61 |
| 3,590,208 | 6/1971 | Martini | 310/268 |
| 3,762,042 | 10/1973 | Abe | 310/268 |
| 3,784,850 | 1/1974 | Inaba | 310/268 |
| 3,790,835 | 2/1974 | Takeda | 310/268 |
| 3,862,289 | 1/1975 | Currell | 310/268 |

*Primary Examiner*—R. Skudy
*Attorney, Agent, or Firm*—Craig & Antonelli

[57] ABSTRACT

A rotor for a flat-type motor is constructed to include a flat armature, which comprises a flat armature winding in the form of a disk, and an insulating resinous body in which the armature winding is embedded. The insulating resinous body has a greater thickness than the armature winding so as to cover the winding, but is formed with cooling structure, such as grooves and bores, in positions where the coil portions of the armature winding on which the magnetic flux of the field magnets acts effectively are embedded, thereby promoting dissipation of heat from the armature winding.

14 Claims, 21 Drawing Figures

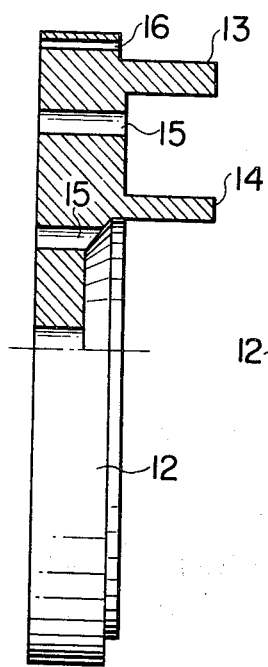
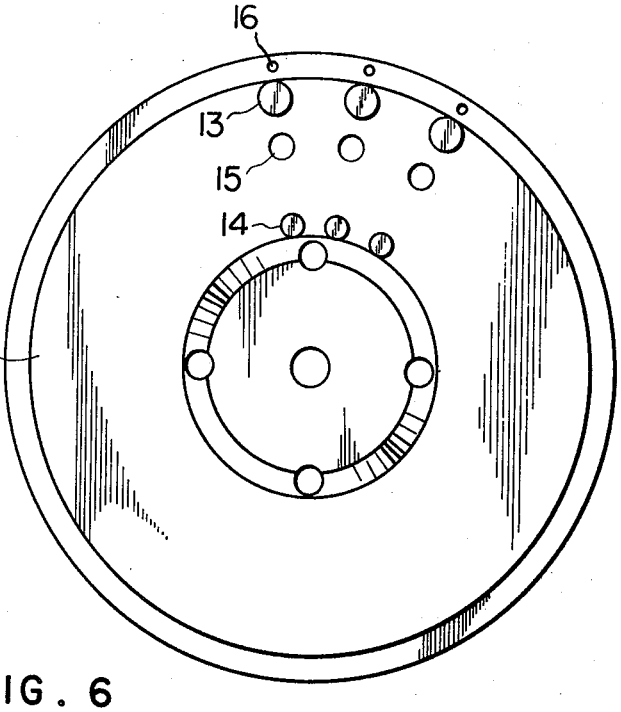
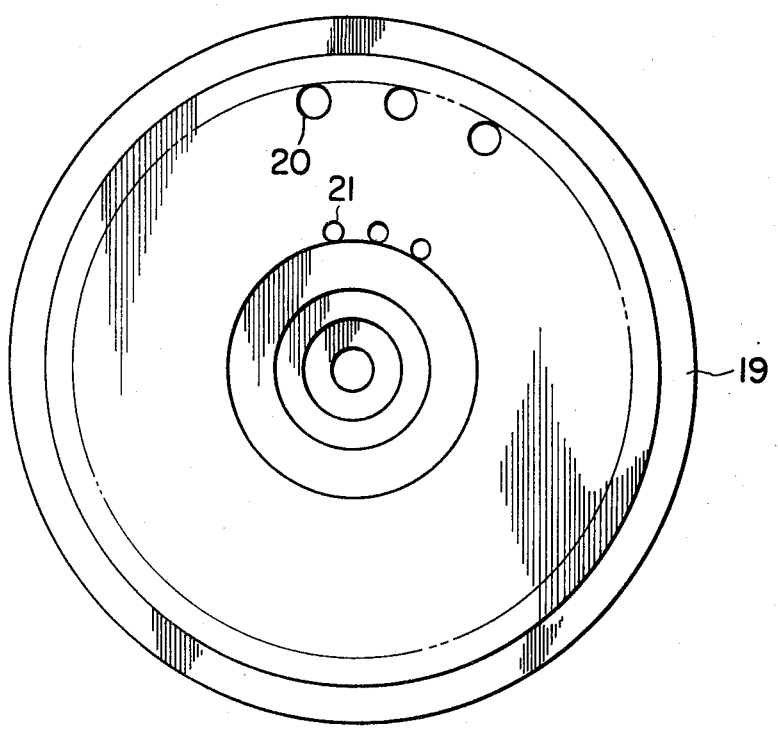

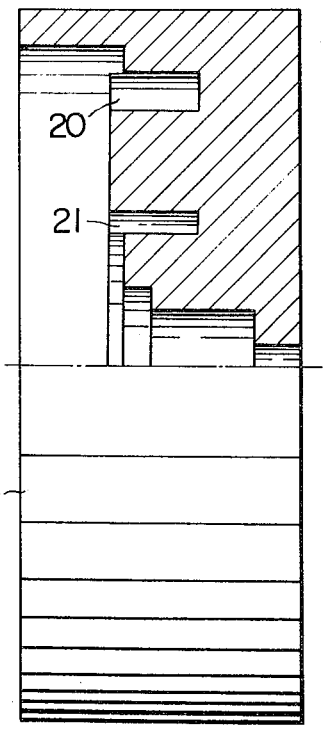
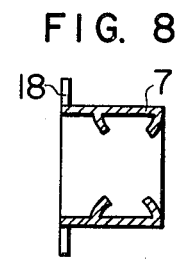
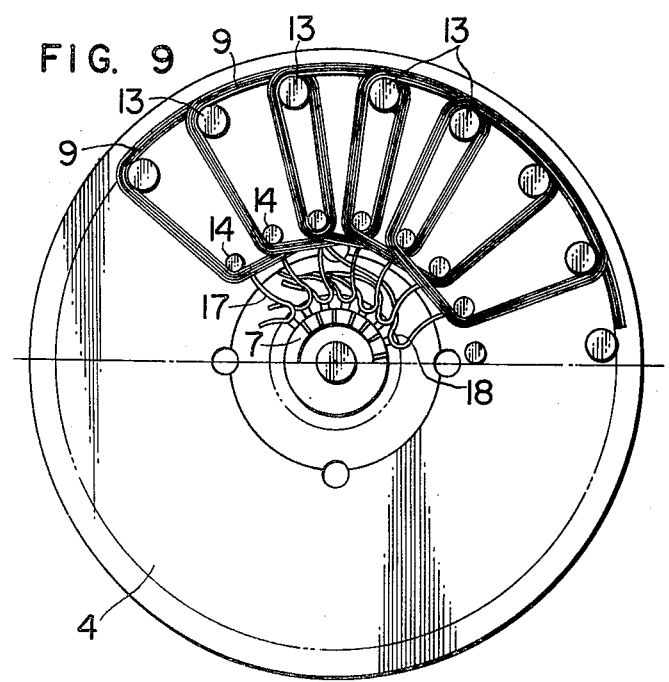
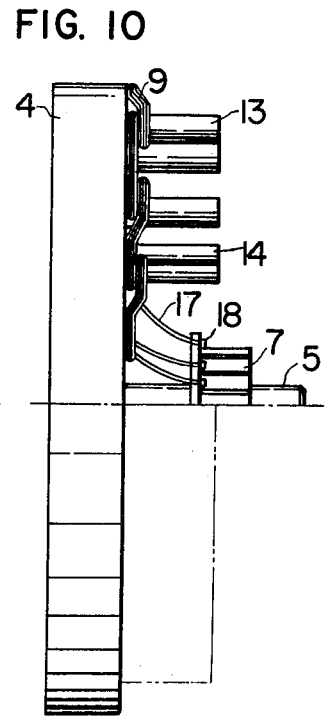

ROTOR OF FLAT-TYPE MOTOR

CROSS REFERENCE TO THE RELATED APPLICATION

This is a Continuation-in-Part application of the U.S. Ser. No. 342,412 filed on Mar. 18, 1973, now U.S. Pat. No. 3,863,336.

BACKGROUND OF THE INVENTION

1. Field of the Invention

This invention relates to a rotor of a flat-type motor and more particularly to a rotor of a flat-type electric motor wherein a coil is wound in a flat space to form an armature coil. This invention is a continuation-in-part of our previous U.S. Pat. application Ser. No. 342,412, now U.S. Pat. No. 3,863,336, for a rotor of flat-type motor and method of manufacturing the same filed Mar. 19, 1973.

2. Description of the Prior Art

A print motor has been known as one of flat-type motors having small length in the axial direction. In the actually used print motors, there are more motors in which the armature circuit is formed by arranging conductive pieces and insulating materials alternately and connecting by welding the ends of the conductive pieces than motors in which the armature circuit is formed by print wiring. In such a print motor, the conductive pieces are not accumulated on an insulating plate but arranged laterally at equal intervals. Therefore, the length in the axial direction of the rotor is equal to the sum of the thickness of the insulating plate and the thickness twice as large as the thickness of the conductive pieces. Thus, the construction of the rotor is made extremely thin. The print motor of this type has a good response because the moment of inertia is small, and accordingly is commonly used as a servomotor.

On the other hand, the feature of flat-type motors having a flat appearance characterizes the use of the flat-type motors in comparison with general cup-like magnet motor. In practice, there are many cases wherein the flat type motors are preferred from the viewpoint of design and saving of space, for example in case of motors for blowers employed in air conditioners or cooling and heating apparatus for automobiles. For instance, in case of blowers for car heaters or car air conditioners generally comprising a sirocco fan and a cup-shaped motor, it becomes difficult to mount the blower to the engine room if the axial length of the blower becomes too long. In general, therefore, it has been common to form a recessed boss on the fan on the opposite side to the motor thereof and make a part of the motor mated with the recessed portion of the inside of the fan to save the space occupied by the blower. This construction, however, hinders smooth air flow within the fan and decreases the effective cross section of the fan and lowers the fan efficiency. If the motor is made flat in shape, the axial length thereof is markedly short and the outer diameter of the motor may be smaller than the outer diameter of the fan, and accordingly, the blower can be made compact as a whole and there is no need to decrease the effective cross section of the fan.

However, print motors have not been put into practical use in the above mentioned field for the following reasons. The first reason is that the print motor is disadvantageous from the viewpoint of noise, vibration, life and so forth. This is because a part of the armature coil serves as a commutator and is subject to brush pressure in the axial direction, and accordingly, the armature is comparatively weak in comparison with the general cup-shaped magnet motor and high accuracy in processing the commutator cannot be expected, and the commutator portion is deformed during revolution due to the brush pressure, the brush touch to the coil is affected by thrust, and the number of commutator segments is too many. Further, although the commutator surface can be easily made parallel to the shaft in a print motor by forming an armature coil and a commutator portion separately and connecting the both electrically, it is impractical and cannot be put into practical use due to its low work efficiency. The second reason is that the print motor cannot be easily manufactured satisfying various motor dimensions. This is because the armature circuit portion is processed by punching and the like and accordingly a large number of motors of the same dimension can be advantageously manufactured, but it is impractical to manufacture certain amount of motors of various dimensions since a great cost and long time is necessary to prepare the different molds. For example, in case of motors to be used for cooling and heating apparatus for automobiles, various dimensions are required to comply with various types of car models and various requirements of customers and the number of the respective dimensions is not always properly large.

In addition to the above described flat-type motors, it has been known in the art to directly wind a coil on a disc and mold it with a resin into an integrated unit, or to wind a coil on a pin fixed to a resinous disc and heat and press it to bury the coil into the disc to form a rotor. There has been no method of making flat-type rotors which is practical in efficiency of production, performance, and manufacturing cost.

SUMMARY OF THE INVENTION

The primary object of the present invention is to provide a rotor of a flat-type motor having short axial length, small size, small weight and low price.

Another object of the present invention is to provide a rotor of a flat-type motor having high performance, being able to be manufactured with any dimensions required and including means for cooling effect thereto.

The features of the present invention lies in a rotor for a flat-type motor including a flat-type armature coil, a shaft located at the center of revolution of said armature coil and a commutator disposed between said shaft and said armature coil so as to be electrically associated with said armature coil, said armature coil, shaft and commutator being integrally molded each other by use of resinous material, characterized in that armature coil portions of said rotor are provided with self-cooling means.

BRIEF DESCRIPTION OF THE DRAWINGS

FIG. 4 is a side view partly in section of a first mold employed in this invention, FIG. 5 is a front view of the first mold shown in FIG. 4, FIG. 6 is a front view of a second mold employed in the present invention, FIG. 7 is a side view partly in section showing the second mold, FIG. 8 is a longitudinal sectional view of a commutator, FIG. 9 is a front view showing the winding of a coil wound in the first mold, FIG. 10 is a side view of the first mold provided with the coil wound therein as shown in FIG. 9.

PREFERRED EMBODIMENTS OF THE INVENTION

Now the present invention will be described hereinbelow with reference to an embodiment thereof.

Figure 1:
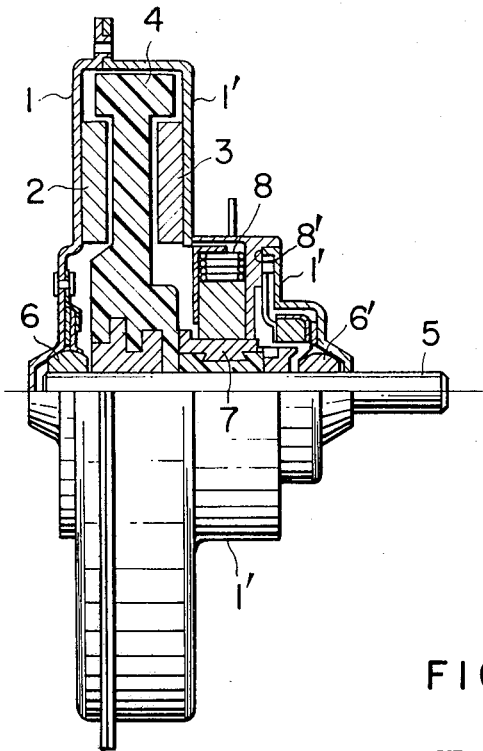
FIG. 1 is a side view partly in section of a flat-type magnet motor in accordance with an embodiment of the present invention.

Referring to FIG. 1, the reference numeral 1 indicates a left housing, 1' indicates a right housing, and 2 and 3 indicate respectively magnets fixed to the interior surfaces thereof. The numeral 4 shows a rotor fixed to a shaft 5 which in turn is supported by bearings 6 and 6'. The reference numeral 7 indicates a commutator. The numeral 8 denotes a brush assembly which comprises a base support, brushes, brush holders and press springs, the assembly being inserted into the housing 1' radially with respect to the shaft 5 through a cut-away portion 8' which is bored on a portion of the circumference of the right housing 1'. The rotor 4 comprises, as shown in FIGS. 2 and 3, an armature coil 9, a core cylinder 11 mated with the shaft 5, and the commutator 7, which are integrally molded each other by use of a resin 10.

Figure 11:
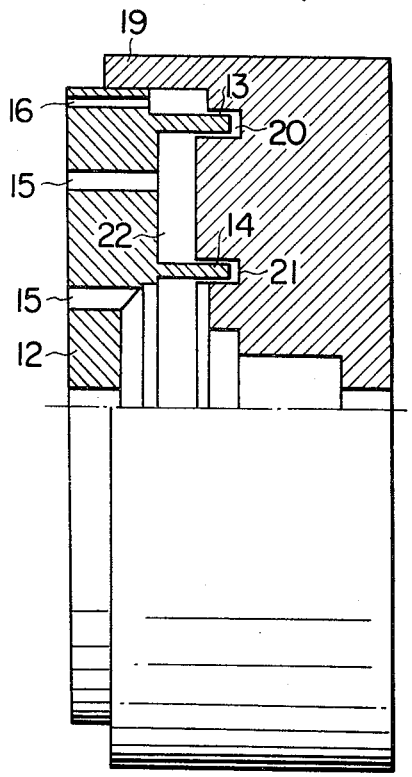
FIG. 11 is a side view partly in section showing the combination of the first and second molds.

One of the methods of manufacturing the rotor 4 is shown in FIGS. 4 to 11. A first mold 12 shown in FIGS. 4 and 5 is provided with outer pins 13 and inner pins 14 of the same number concentrically arranged at equal intervals. The first mold 12 is further provided with resin injection ports 15 and air holes 16. A coil 9 is wound around the outer pins 13 and inner pins 14 as shown in FIGS. 9 and 10 by use of a conductive material 9' (FIG. 3). It will be noted that the outer pins 13 may be made, as explained hereinafter with reference to FIGS. 18 and 19, oval in shape or comprise combinations of two pins in order that the coil 9 may be wound more widely than that shown in FIG. 9 and the effective magnetic flux may increase. Then, the shaft 5 is disposed at the center of the first mold 12 and the terminal end 17 of the coil 9 is connected with a riser 18 of a commutator 7 as shown in FIG. 8. The commutator 7 is molded and inserted into the shaft 5 in advance. Further, the shaft 5 is provided with a core cylinder 11 made of iron inserted thereinto. Thereafter, a second mold 19 as shown in FIGS. 6 and 7 is combined with the first mold 12. The second mold 19 is provided with outer pin holes 20 and inner pin holes 21 corresponding to the outer pins 13 and inner pins 14 of the first mold 12, respectively. A space 22 for a rotor is formed with the first and the second molds 12, 19 combined together (FIG. 11). At this stage, the thickness of the rotor 4 at the armature coil portion thereof corresponding to a magnet becomes substantially equal to or slightly larger than the thickness of the coil itself. Then, a resin such as polycarbonate is injected through the resin injection ports 15. When the molds 12 and 19 are removed afterwards, a rotor 4 is integrally formed with the shaft 5 and a space 23 corresponding to the pin holes is formed (FIG. 2). Further, the core cylinder 11 is employed for the purpose of facilitating the combination of the resin and the shaft 5, and accordingly can be made as a large diameter portion of the shaft 5 or can be omitted if sufficient combination with the resin is obtainable only with the shaft 5. It will be noted that it is also possible to set a part of the commutator in each mold together with the shaft without molding the commutator in advance and connecting the ends of the respective coils thereto so that the parts of the commutator 7 may be molded with the shaft 5 simultaneously with the molding of the coils.

Figure 12:
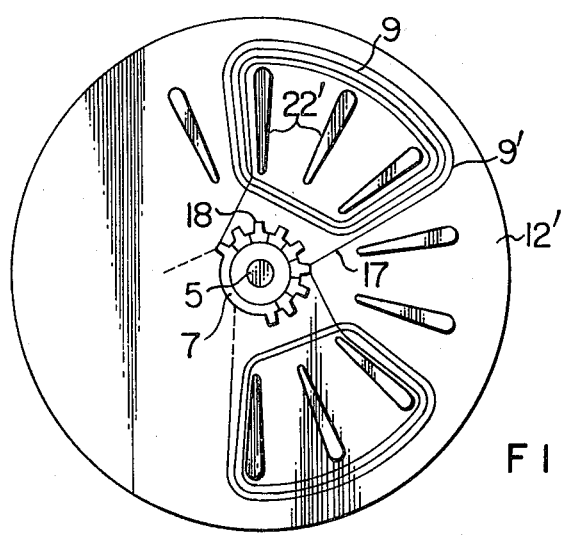
FIG. 12 is a front view of another embodiment of the first mold showing the winding of a coil provided therein.

Another method of manufacturing the armature coil in accordance with the present invention is shown in FIG. 12. In this method, the pins of the first mold 12' comprise radially extending elongated pins 22' serving partly as said outer pins 13 and partly as said inner pins 14 of the first method. The shaft 5 and the commutator 7 are inserted into the first mold 12' at the time of winding coil. The end of the coil 17 is connected with the riser 18 of the commutator 7 when a conductive material 9' is wound in a coil around the pins 22' to form an armature coil 9. Thereafter, the whole assembly is molded into a unit.

Figure 2:
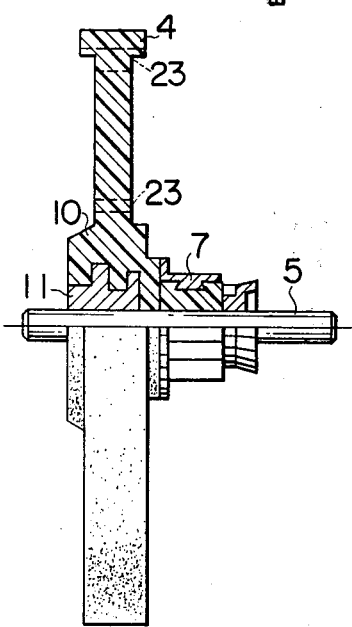
FIG. 2 is a side view partly in section of a rotor portion of the magnet motor.
Figure 3:
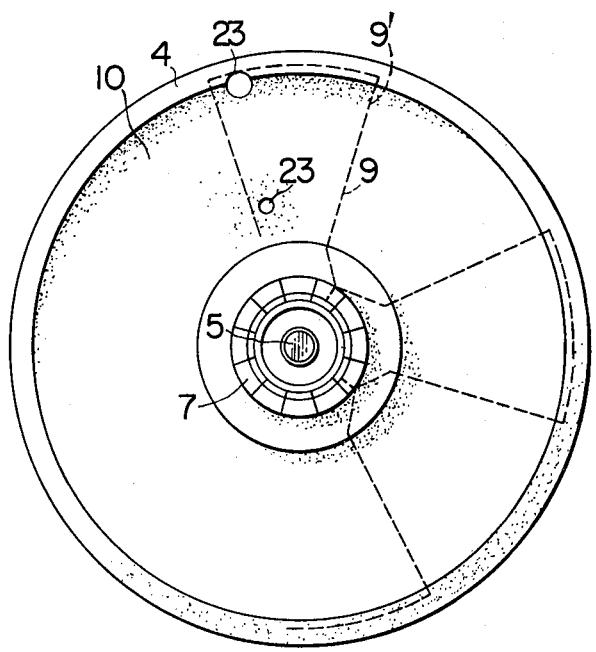
FIG. 3 is a front view of the rotor showing the arrangement of the coil wound thereon.

The spaces 23 formed after removing the molds from the molded coil as shown in FIGS. 2 and 3 have an effect of making an air flow when the rotor rotates and results in cooling of the rotor. Further, the spaces 23 can also be used to fill proper material with in order to balance the rotor.

At the time of winding coil 9 or combining the second mold with the first, it sometimes happens that the insulating cover or shield of the coil comes off, which results in faulty insulation. One of the countermeasures for this trouble is to provide a projection on the inner surface of the first and second molds so that the coil 9 may be located at the center of the space before molding and uniform small spaces may be obtained between the side face of the coil and the inner surface of the first and second molds, whereby the side face of the coil is not directly exposed after molding. As for the projection provided for this purpose, still another embodiment of the present invention is shown in FIGS. 14 to 17, in which two rows of protruded strips are formed in the first and second molds, respectively. In this case, the protruded strips formed in the first and second molds cause grooves to be formed on both surfaces of the flat-type rotor and the grooves thus formed serve as elements for providing remarkable cooling effect to the rotor when the rotor rotates. It was confirmed from the result of experiments that the rotor formed with the grooves (two rows of grooves) could prevent the temperature thereof from being raised at about 2 to 3° C compared with the rotor formed with only the bores or spaces 23 for cooling effect. This means that a great cooling effect is obtained by increasing the number of grooves to be formed on the surfaces of the rotor.

Figure 17:
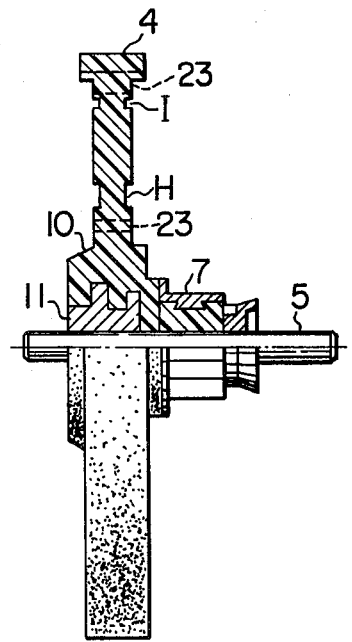
FIG. 17 is a side view partly in section similar to FIG. 2, of a rotor portion of the flat-type motor in accordance with still another embodiment of the present invention.
Figure 14:
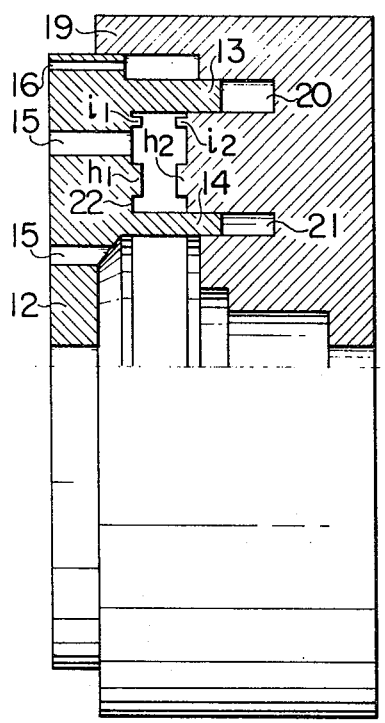
FIG. 14 is a side view partly in section similar to FIG. 11 illustrating the combination of the first and second molds in still another embodiment of the present invention.
Figure 15:
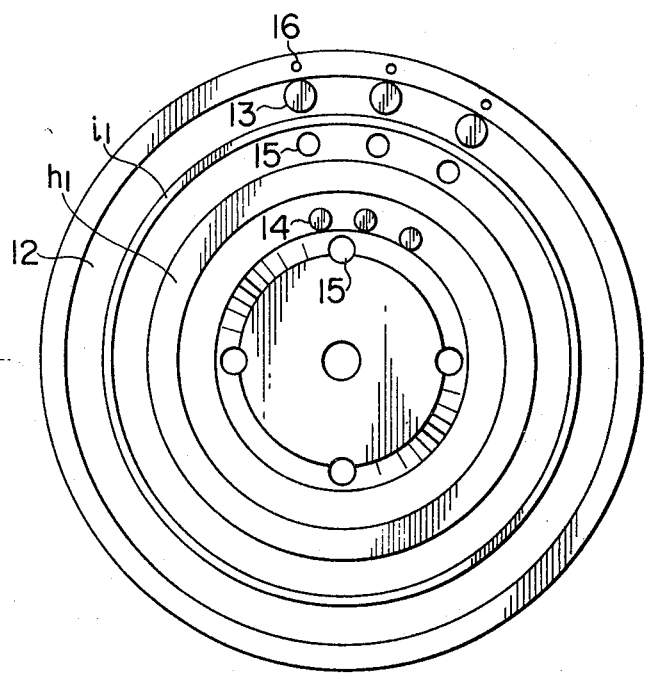
FIG. 15 is a front view of the first mold shown in FIG. 14.
Figure 16:
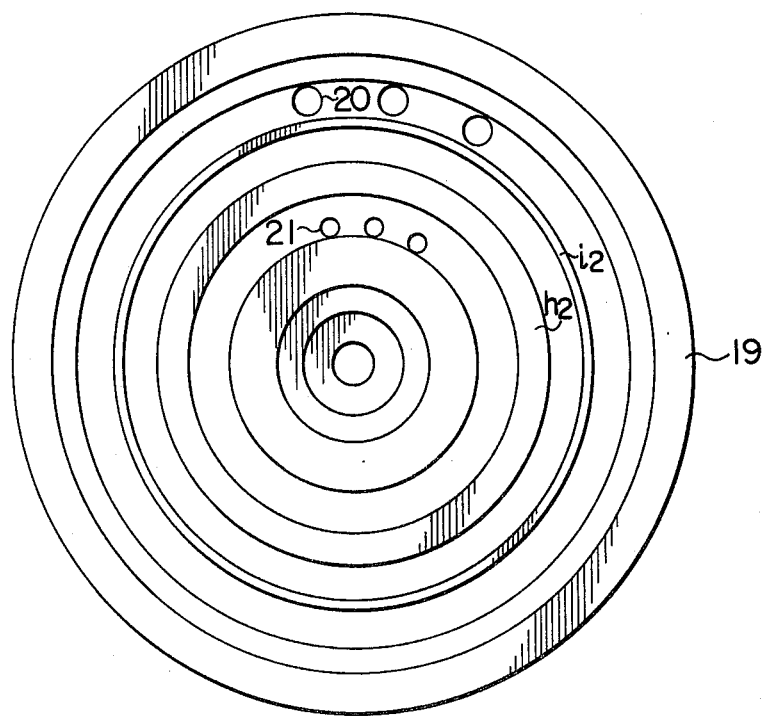
FIG. 16 is a front view of the second mold shown in FIG. 14.

Referring to FIGS. 14 to 17, two rows of protruding strips are indicated by $h_1$ and $i_1$ on the first mold 12, and $h_2$ and $i_2$ on the second mold 19. These two rows of protruding strips have a height of about 0.5 mm and a width of 7.0 mm, and are located between the pins 13 and 14 on the mold 12 and the pin holes 20 and 21 on the mold 19. The two rows of protruding strips are arranged symmetrically about the inner surfaces of the first and second molds so that the coil 9 may be located at the center of the space or cavity between the molds. The rotor manufactured by such first and second molds has two circular grooves I and H on the surfaces of coil portion thereof as shown in FIG. 17. The provision of these grooves results in increase of a radiating area for the armature coil portion and prevents a temperature of the rotor from being raised. It will be understood that the more the number of the grooves is increased, the more the radiating area of the coil portion also becomes large and therefore a great cooling effect to the rotor is obtained. In order to obtain the maximum cooling effect the rotor may be formed with wave-like surfaces which are available by the corresponding wave-like projections on the inner faces of the first and second molds (not shown). Further, the foregoing grooves on the armature coil portion of the rotor are not limited to an annular shape as shown in the embodiment, but may be replaced by a plurality of dotty projections. In addition, it is noted that the armature coil portion of the rotor having grooves may be provided without the aligned protruding strips of the first and second molds.

Figure 18:
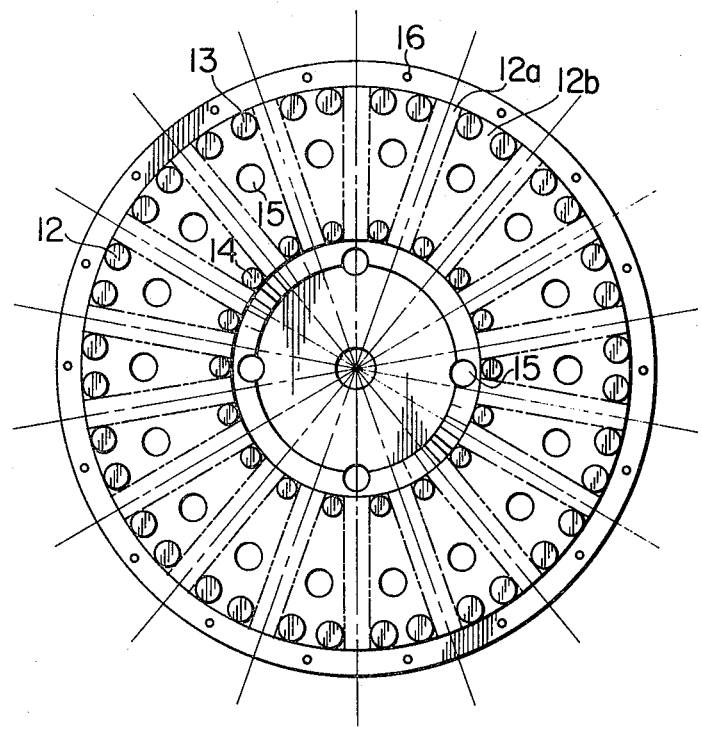
FIGS. 18 and 19 are front views of the first molds according to further embodiments of the present invention, respectively.

FIG. 18 shows a mold for manufacturing a rotor according to a further embodiment of the present invention. In this embodiment, there are two outer pins 13 relative to one inner pin 14 with the interval between a set of two outer pins and an adjacent set of two outer pins having substantially the same dimension as the interval between two adjacent inner pins 14, so that the width of a slot 12a to be occupied by the armature coil has substantially the same dimension as the interval between the two adjacent inner pins at any position in the effective length portion of coil extending in the radial direction of the mold. It should be noted that this arrangement is on the basis of the fact that the more the number and space of bores for cooling is, the more the effect of cooling is, and in order to increase the number and space of the bores for cooling it is necessary to provide plenty of area where the bores for cooling are provided in the armature coil portion of the rotor. With the arrangement, the slots form a minimum space determined by the interval between the inner pins 14, and therefore it is possible to secure sufficiently providing the areas for cooling bores between the adjacent slots. As a result of experiments, it was confirmed that the arrangement formed with two cooling bores corresponding to the outer pins as shown in FIG. 18 could prevent the temperature of the rotor from being raised at about 1 to 2° C compared with the arrangement formed with one cooling bore.

Figure 19:
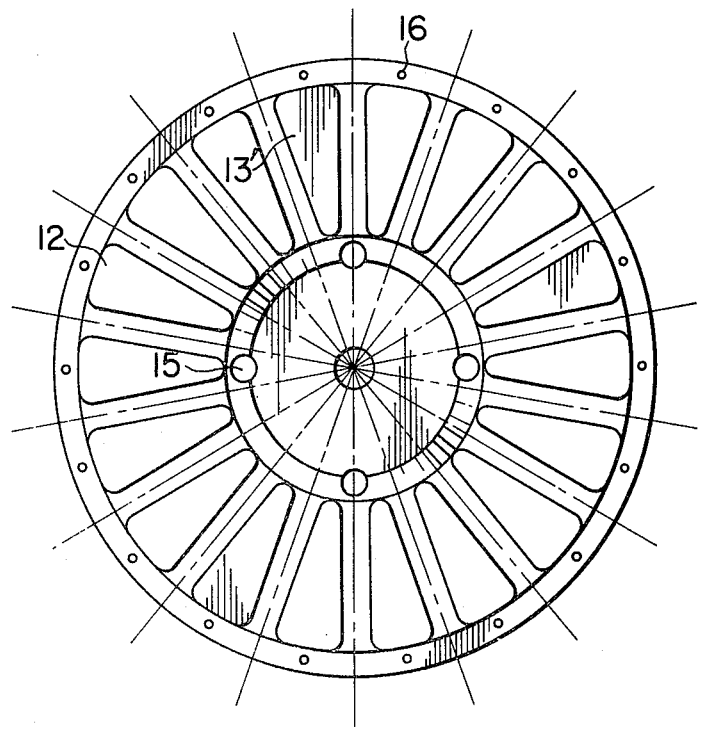

FIG. 19 shows a mold for manufacturing a rotor according to a further another embodiment of the present invention. In this embodiment, a whole area located between the slots is formed as a flat segmentary pin 13' instead of the inner pin 14 and the outer pins 13 as shown in FIG. 18. With the arrangement of the flat segmentary pins in the mold, more excellent cooling effect to the rotor can be obtained. Alternatively, two outer pins 13 shown in FIG. 18 may be formed integrally with each other on the mold to make an elliptical pin in order to obtain the excellent cooling effect to the rotor.

In addition, the arrangement of an armature coil such as obtained by the molds as shown in FIGS. 18 and 19 may be utilized also for the rotor that is manufactured by a different method from this invention and formed with no pin holes in order to provide similar cooling bores thereto. With the rotor, the cooling bores are drilled after molding in the segmentary resin portions without a molded armature coil. Such arrangement of an armature coil is preferable for drilling of the cooling bores because the arrangement of an armature coil provides plenty of resinous portions without a molded armature coil and therefore, there is little care of breaking the armature coil by drilling. Further, the rotor of this invention sometimes needs to be provided with drilled bores after molding in order to balance the rotor, and in this case the arrangement of an armature coil as shown in FIGS. 18 and 19 is advantageous because of the same reason as above-mentioned.

In such arrangement of an armature coil, the effective length portion of the coil extending in the radial direction crosses completely at right angle with the flux of the magnet and thus it will be noted that in addition to the advantage of cooling effect, a further advantage is obtained in increasement of the effective magnetic flux.

In accordance with the flat-type motor of the present invention, the magnetic flux makes a closed loop through the magnet 2(N) - magnet 3(S) - right housing 1'- left housing 1 - magnet 2. The amount of magnetic flux between the magnet 2 and the magnet 3 influences the performance of the rotor. The amount of magnetic flux at this portion decreases as the length of the space between the magnets 2 and 3 increases. Therefore, in order to obtain a desired torque, it becomes necessary to reduce the length of the space or increase the number of conductive members. If the number of conductive members increases, copper loss increases and the efficiency of the motor is lowered. Accordingly, it becomes necessary to make the length of space between the magnets 2 and 3 as small as possible. In this invention, a resinous material or the like is filled in the spaces between the armature coils of the rotor 4 to strengthen the conductive portion of the rotor and make it fixed integrally with the shaft, and accordingly there is no need to provide an insulating plate for supporting and reinforcing the coil. Based on this, the thickness of the rotor between the magnets 2 and 3 can be made as small as the thickness of the coil. Thus, the length of the space can be made short. Further, by making the dimension of the magnets 2 and 3 large in the axial and radial directions it is possible to increase the amount of magnetic flux and increase the output easily.

Furthermore, the thickness of the armature coil can be further decreased by increasing the number of coils to reduce the number of conductive members per coil. However, if the number of coils is increased, the number of pins and the number of commutator segments increase and accordingly the winding and connecting work of the coils becomes markedly troublesome. Besides, if the number of pins is increased, the diameter of the pins is naturally made small and accordingly the strength of a pin is lowered. At the same time, the operation to make the pins 13, 14 of the first mold 12 mated with the pin holes 20, 21 of the second mold 19 becomes difficult and the life of the molds is shortened.

Figure 13C:
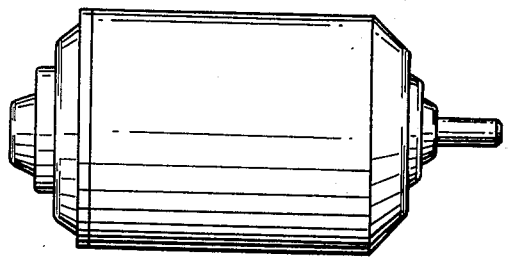
FIGS. 13a to 13c are side views showing the appearance and dimensions of the flat-type motor of the present invention and other type of conventional motors used in the performance comparison test mentioned in this specification.
Figure 13A:
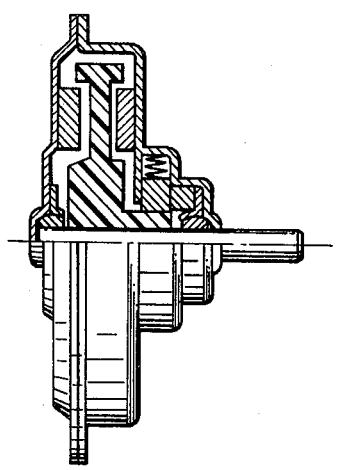
Figure 13B:
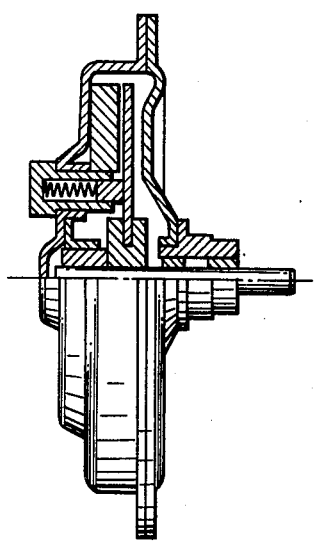

The inventors confirmed by experiments that the motor obtained in accordance with the present invention as mentioned above presented as high efficiency and performance as the conventional print motors and cup-shaped magnet motors. Table I shows the results of the experiments, and FIG. 13 show the shape and dimensions of the motors used in the experiments, wherein FIG. 13a shows a motor made in accordance with the present invention, FIG. 13b shows a print motor, and FIG. 13c shows a cup-shaped motor. The motor shown in FIG. 13a manufactured in accordance with the first embodiment of the present invention was made with 19 coils in which the number of windings of the conductive wire per coil was 13 with a wire of 0.6 mm diameter, the outer diameter of the rotor was 106 mm, and the air gap was 5.6 mm. The continuous rated life thereof was proved to be longer than 3000 hours and output of 50 W and efficiency of 62 % were obtained. In the comparison of the motors under input of 80 W, the efficiency of 62 % of the motor of this invention was superior to 50 % of the print motor and 55 % of the cup-shaped magnet motor. Further, the motor of this invention was proved to be superior even from the viewpoint of temperature rise and noise.

Table I

| | | motor of this invention | print motor | cup-shaped motor |
|---|---|---|---|---|
| Performance | Efficiency | 62 % | 50 % | 55 % |
| | Temperature Rise | 50° C | 60° C | 75° C |
| | Noise | 53 dB | 60 dB | 53 dB |
| Size | Dimensions (D×B) | 110φ× 54.6 | 129φ× 59 | 58φ× 94.7 |
| | Weight | 700 g | 900 g | 700 g |

Following reasons can be considered for the high performance of the motor made in accordance with the present invention in comparison with the print motors. First, the armature coils of the print motor are generally made by punching a copper plate, and accordingly there is a limit in the thickness of the plate to be punched. Therefore, the thickness of the coil cannot be made over a predetermined value and the electric resistance between is made large, which results in increase in copper loss and lowering of efficiency. On the other hand, with respect to the cup-shaped motor, the following reasons can be considered. Since the rotor of the cup-shaped motor is generally made by winding an armature coil around an armature core comprising piled up iron or silicon steel plates, an eddy current loss and hysteresis loss are generated at the time of revolution of the armature and the efficiency is lowered. Further, because of its great weight, there is mechanical loss due to inertia and loss of bearing abrasion. To the contrary, in the case of the motor of the present invention tested in the experiments no eddy current or hysteresis loss is made because no magnetic material such as iron or silicon steel at the portion where the rotor intersects with magnetic flux. In addition thereto, there is no mechanical loss because the weight of the motor of this invention is small.

Since, in the flat-type motor in accordance with the present invention, the manufacture of a rotor and integration of the rotor with the shaft and commutator can be carried out markedly easily, the motor can be manufactured at a considerably low cost.

Further, in particular in comparison with the print motor, the motor made in accordance with the present invention has the following advantages. First, since the contact surface of the commutator and brush can be made parallel to the shaft, the processing accuracy of the contact surface of the commutator can be enhanced, and owing to the constant speed of the contact surface of the brush there is little noise. Further, since the peripheral speed of the brush is constant, a good commutation can be expected and accordingly the life is elongated. Besides, the number and diameter of the coil windings can be freely selected and the rotor can be accomodated to various types of molds and processing machines. Various dimensions of motors can be easily manufactured using same parts, accordingly.

The motor in accordance with the present invention is applicable not only to said automobiles but also to servomotors utilizing the feature thereof that the weight of the armature is small. In view of the feature that the length thereof is small in the axial length and there is generated little noise and the performance is mechanically stable, the motor made in accordance with the present invention is suitable for a tape recorder and makes the size of the tape recorder compact when adapted thereto.

What is claimed is:

1. A rotor for a flat-type motor comprising a flat-type armature, a commutator and a rotary shaft,
    wherein said flat-type armature comprises a flat armature winding arranged in the form of a flat disk, said armature winding including radially extending coil portions, and insulating resinous body means for embedding said armature winding, said insulating resinous body means including at least one major surface having groove means formed thereon for effecting self-cooling of said armature winding, said groove means being partially disposed in a portion of said resinous body means which covers said radially extending coil portions of said armature winding.
    wherein said groove means include annular grooves arranged along the entire circumference of said at least one major surface of said insulating resinous body means, and
    wherein said commutator is disposed in the central portion of said flat-type armature for electrical connection thereto, and said commutator is formed integrally therewith by said insulating resinous body means, said rotary shaft being secured to said commutator at the center thereof to extend perpendicularly to said flat-type armature.

2. A rotor as claimed in claim 1, wherein said groove means include at least two of said annular grooves.

3. A rotor as claimed in claim 2, wherein said two grooves have different widths.

4. A rotor for a flat-type motor comprising a flat-type armature, a commutator and a rotary shaft,
wherein said flat-type armature comprises a flat armature winding arranged in the form of a flat disk, said armature winding including radially extending coil portions, and insulating resinous body means for embedding said armature winding, said insulating resinous body means including at least one major surface having groove means formed thereon for effecting self-cooling of said armature winding, said groove means being partially disposed in a portion of said resinous body means which covers said radially extending coil portions of said armature winding,
wherein said groove means include annular grooves arranged along the entire circumference of opposite major surfaces of said insulating resinous body means in opposed relation to each other, and
wherein said commutator is disposed in the central portion of said flat-type armature for electrical connection thereto, and said commutator is formed integrally therewith by said insulating resinous body means, said rotary shaft being secured to said commutator at the center thereof to extend perpendicularly to said flat-type armature.

5. A rotor as claimed in claim 4, wherein said groove means include at least two of said annular grooves on each of said opposite major surfaces in opposed relation to each other.

6. A rotor as claimed in claim 5, wherein said two grooves have different widths.

7. A rotor for a flat-type motor comprising a flat-type armature, a commutator and a rotary shaft,
wherein said flat-type armature comprises a flat armature winding arranged in the form of a flat disk, said armature winding including radially extending coil portions and bending coil portions at the ends of said radially extending coil portions, and insulating resinous body means for embedding said armature winding, said insulating resinous body means including at least one major surface having groove means formed thereon and bore means formed therethrough, each of said groove means and bore means effecting self-cooling of said armature winding, said groove means being partially disposed in a portion of said resinous body means which covers said radially extending coil portions of said armature winding, and said bore means being disposed along each of said bending coil portions of said armature winding,
wherein said groove means include annular grooves arranged along the entire circumference of said at least one major surface of said insulating resinous body means, and
wherein said commutator is disposed in the central portion of said flat-type armature for electrical connection thereto, and said commutator is formed integrally therewith by said insulating resinous body means, said rotary shaft being secured to said commutator at the center thereof to extend perpendicularly to said flat-type armature.

8. A rotor as claimed in claim 7, wherein said groove means include at least two of said annular grooves.

9. A rotor as claimed in claim 8, wherein said two grooves have different widths.

10. A rotor as claimed in claim 8, wherein said bore means include at least two bores, each disposed at a bending coil portion, and wherein said two annular grooves are disposed between said two bores.

11. A rotor for a flat-type motor comprising a flat-type armature, a commutator and a rotary shaft,
wherein said flat-type armature comprises a flat armature winding arranged in the form of a flat disk, said armature winding including radially extending coil portions and bending coil portions at the ends of said radially extending coil portions, and insulating resinous body means for embedding said armature winding, said insulating resinous body means including at least one major surface having groove means formed thereon and bore means formed therethrough, each of said groove means and bore means effecting self-cooling of said armature winding, said groove means being partially disposed in a portion of said resinous body means which covers said radially extending coil portions of said armature winding, and said bore means being disposed along each of said bending coil portions of said armature winding,
wherein said groove means include annular grooves arranged along the entire circumference of opposite major surfaces of said insulating resinous body means in opposed relation to each other, and
wherein said commutator is disposed in the central portion of said flat-type armature for electrical connection thereto, and said commutator is formed integrally therewith by said insulating resinous body means, said rotary shaft being secured to said commutator at the center thereof to extend perpendicularly to said flat-type armature.

12. A rotor as claimed in claim 11, wherein said groove means include at least two of said annular grooves on each of said opposite major surfaces in opposed relation to each other.

13. A rotor as claimed in claim 12, wherein said two grooves have different widths.

14. A rotor as claimed in claim 12, wherein said bore means include at least two bores, each disposed at a bending coil portion, and wherein said two annular grooves on said opposite major surfaces are disposed between said two bores.

* * * * *